United States Patent Office 2,803,581
Patented Aug. 20, 1957

2,803,581

NONINFLAMMABLE FUMIGANT MIXTURE

James O. Hibbard, Kansas City, Mo., assignor to Research Products Company, Kansas City, Mo., a corporation of Missouri No Drawing. Application April 13, 1954,
Serial No. 422,985

3 Claims. (Cl. 167—39)

This invention relates to fumigants and more particularly to new and improved mixtures and to a method of fumigating insect infested grain with substantially no hazard due to fire or explosion of the fumigant.

There have been many volatile organic compounds suggested and used as fumigants and particularly for grain stored in elevators and other suitable structures. A convenient method of accomplishing insect control is by applying the fumigant toxicant in liquid form upon the surface of the stored grain and permitting the fumes to pass downwardly through the body of the stored grain. Some liquid fumigants are selective in action and effective against only some of the major grain infecting insects and other fumigants are absorbed by the grain and impart an undesirable taste or odor to products made from such grain or adversely affect the germinating properties of the grain. Some fumigants in laboratory or experimental operations may control common grain infecting insects at low toxicant concentrations and yet in large scale treatment of deep bins and granaries fail to control insect infestation at all levels of the stored grain. Since the survival of even a few live insects permits the rapid build up of the infesting organisms, such fumigants are generally unsatisfactory. Use of large excesses of the toxicant may accomplish an improved kill of insects but such practice is not economical and the high concentration of toxicant may result in injury to the grain.

There are liquid fumigants that will control grain insects generally and, while not subject to the above disadvantages, are inflammable and explosive. The present invention is particularly concerned with new and improved mixtures of this latter class of liquid fumigants whereby they can be safely handled and used without loss of effect in control of insect infestation.

The objects of the present invention are to provide a new and improved fumigant composition containing inflammable or explosive ingredients and which will control insects generally and will be safe from hazards of fire or explosions; to provide a substantially non-flammable fumigant mixture that will accomplish the total kill of insects without imparting undesirable properties to the treated grain; to provide a substantially non-flammable fumigant mixture containing carbon bisulphide; and to provide a method for the fumigation of stored grain which will accomplish a complete kill of insects at all levels in the grain without danger of fire or explosion of the fumigant. Other objects will become apparent from the following specification and examples.

According to the present invention, improved fumigant mixtures are provided which comprise as a major toxic ingredient a solution of carbon bisulphide, or carbon bisulphide and other toxic ingredients, such as ethylene dibromide in carbon tetrachloride with methylene chloride. It is to be understood that ethylene dibromide is sometimes referred to as ethylene bromide and that methylene chloride is sometimes referred to as dichloromethane or methylene bichloride. These fumigants have been found to be excellent with respect to their control of insect infestations and also are easily handled and applied in that high pressure containers and special applicators are not required as with many volatile organic materials.

The procedure for treating grain stored in bins, elevators and the like with the improved fumigant mixtures of the present invention for complete control of weevils, bores, beetles and other insects in their various stages of their life cycle from egg to adult is to introduce the fumigant mixture into the top of a grain containing bin, elevator and the like and by applying the fumigant mixture to the surface of the grain. The vapor pressures of the fumigant mixtures are such that a gradual distribution and penetration of the toxic fumes is obtained throughout the limits of the confining structure of suitable size with no undesirable vapor stratification or channeling effect.

Various fumigant compositions are generally non-flammable, for example a fumigant composition of from 2.5 to 20 parts by volume of ethylene dibromide dissolved in from 97.5 to 80 parts by volume of carbon tetrachloride is substantially non-flammable. However when carbon bisulphide is added to such a fumigant composition the mixture becomes flammable and explosive. For example a composition of 7 parts by volume of ethylene dibromide and 13 parts by volume of carbon bisulphide dissolved in 80 parts by volume of carbon tetrachloride, while an effective fumigant, has been found in tests to flash in a closed cup at below 40° F., flash in an open cup at 50° F. and fire in an open cup at 85° F. A composition consisting of 20 parts by volume of carbon bisulphide dissolved in 80 parts by volume of carbon tetrachloride has been found to flash in a closed cup at below 40° F., flash in an open cup at below 40° F. and fire in an open cup at 55° F. These examples of fumigants containing carbon bisulphide clearly indicate that such fumigant compositions not only are dangerous to handle but also create hazards in use in treating stored grain and the like for insect control.

A substantial amount of methylene chloride may be employed with carbon bisulphide in fumigant compositions to obtain improved properties particularly reduced flammability. The preferred range of proportion consists of from 2 to 20 percent by volume of methylene chloride in mixtures including carbon bisulphide or carbon bisulphide with a substantial proportion of the mixture being carbon tetrachloride. With such mixtures complete control at all levels of stored grain may be obtained under a variety of temperature conditions without danger of fire or explosion of the fumigant. In fumigant mixtures which include substantial proportions of carbon bisulphide, for example up to thirty (30) percent by volume, the preferred range of methylene chloride is from 2 to 70 percent by volume. In such fumigant mixtures wherein the carbon bisulphide and methylene chloride total less than 100 percent, carbon tetrachloride or other suitable ingredients may make up the remainder of the mixture. A definite synergistic effect as regards flammability has been observed for these compositions.

In flash and fire tests of mixtures of carbon bisulphide and methylene chloride it has been found that 60 parts by volume of carbon bisulphide with 40 parts by volume of methylene chloride flashes in a closed cup at less than 40° F., flashes in an open cup at less than 40° F., and fires in an open cup at approximately 45° F. A mixture consisting of 50 parts by volume of carbon bisulphide and 50 parts by volume of methylene chloride flashes in a closed cup at less than 40° F., flashes in an open cup at less than 40° F., and fires in an open cut at approximately 50° F. It has also been found that in mixtures of from 15 to 25 parts by volume of carbon bisulphide in 85 to 75 parts by volume of methylene chloride flash in closed cups at less than 40° F., flash in open cups at less than 40° F. but no fire occurs in open cup tests wherein the temperature was increased above the boiling temperature of the composition. In mixtures containing 10 parts or less by volume of carbon bisulphide and 90 parts or more by volume of methylene chloride no flash occurred in closed or open cups and no fire occurred in the open cup tests.

When methylene chloride is employed with a mixture of 20 parts by volume of carbon bisulphide and 80 parts by volume of carbon tetrachloride, for example, 2 parts by volume of methylene chloride in 98 parts by volume of the said mixture, it provides a composition that flashes in a closed cup at less than 40° F., flashes in an open cup at less than 40° F. but results in no fire in the open cup. When 6 parts by volume of methylene chloride is employed with 94 parts by volume of the said 80–20 mixture, the composition flashes in a closed cup at less than 40° F., but in an open cup there is no flash and no fire. Increased proportions of the methylene chloride in said mixture results in increased temperatures wherein flash in closed cups occur and the proportions can be increased until there is no flash in the closed cup.

When methylene chloride is used with a fumigant mixture consisting of 13 parts carbon bisulphide, 7 parts ethylene dibromide and 80 parts carbon tetrachloride, all parts being by volume, it is found that with 1 part methylene chloride with 99 parts of said mixture there is a flash in the closed cup at less than 40° F., a flash in the open cup at approximately 50° F. but no fire in the open cup tests. It has also been found that by increasing the proportions of the methylene chloride to said fumigant mixture the temperature at which flash occurred in a closed cup progressively elevated and that no flash and no fire occurred in the open cups. This fumigant with the preferred range of the concentration of methylene chloride provides a fumigant mixture of approximately 13% by volume of carbon bisulphide, 7% by volume of ethylene dibromide, 2 to 20% by volume of methylene chloride and 60 to 78% by volume of carbon tetrachloride. It is believed that these examples clearly show that, while carbon tetrachloride and ethylene dibromide and other substantially non-flammable fumigant ingredients in a composition containing carbon bisulphide served as diluents or reduced the concentration of the carbon bisulphide in the composition, they do not eliminate the flammable characteristics of the composition containing the carbon bisulphides. However, when relatively small quantities of methylene chloride are employed in such compositions, the flammable characteristic of the carbon bisulphide is materially reduced sufficiently whereby the composition can be safely used for treating grain in elevators, bins and the like.

Ethylene dibromide is merely an example of other toxic organic liquids which are compatible with and may be included in the composition having carbon bisulphide and methylene chloride to form an effective fumigant in which the flammability of the carbon bisulphide is materially reduced.

It is believed obvious that I have provided a fumigant mixture containing carbon bisulphide that is substantially non-flammable and safe to use for insect control in bins, granaries and the like.

What I claim and desire to secure by Letters Patent is:

1. A fumigant composition including as an active toxic ingredient a mixture of carbon bisulphide in carbon tetrachloride with a substantial proportion of methylene chloride for reducing the flammability of the mixture.

2. A fumigant composition comprising, a volatile liquid including carbon bisulphide and carbon tetrachloride wherein a substantial proportion thereof is carbon tetrachloride, and methylene chloride in the proportion of 2 to 20% of the combined volume of said carbon bisulphide and carbon tetrachloride.

3. A fumigant composition comprising, a volatile liquid including approximately 13% by volume of carbon bisulphide, 7% by volume of ethylene dibromide, 2 to 20% by volume of methylene chloride, and 60 to 78% by volume of carbon tetrachloride.

References Cited in the file of this patent
UNITED STATES PATENTS
1,078,030    Aylsworth _____ Nov. 11, 1913

OTHER REFERENCES

Lindgren et al.: J. of Econ. Entomology, vol. 44, No. 6, December 1951, pp. 975–979.

Roark: U. S. Dept. of Agri. Tech. Bull., No. 162, March 1929.

Balock: J. of Econ. Entomology, vol. 44, No. 5, October 1951, pp. 657–659.